March 22, 1949.  C. P. TOLMAN  2,465,135

DUAL WHEEL BRAKE ASSEMBLY

Filed May 25, 1946

INVENTOR
Charles P. Tolman
BY
Morgan, Finnegan and Durham
ATTORNEYS

Patented Mar. 22, 1949

2,465,135

UNITED STATES PATENT OFFICE 2,465,135

DUAL WHEEL BRAKE ASSEMBLY

Charles P. Tolman, Kew Gardens, N. Y., assignor to Differential Wheel Corporation, Detroit, Mich., a corporation of Delaware Application May 25, 1946, Serial No. 672,325

2 Claims. (Cl. 188—18)

1

The present invention pertains to dual wheel assemblies for vehicles but more particularly and specifically to a braking system for an assembly in which the wheels are normally independently rotatable.

The type of dual wheel assemblies to which the present invention is particularly adapted are disclosed in the Charles S. Ash United States Letters Patents 2,192,023 dated February 27, 1940, and 2,275,025 dated February 3, 1942, from which a more comprehensive and detailed understanding and disclosure of the precise construction and operation of the braking system can be ascertained.

In the arrangements of the devices of the Ash patents and devices of a similar nature the constructions are such that lubrication must be provided for operating and contacting members and surfaces of the braking mechanism with the result that this lubricant reaches the braking and the cooperating clutching members or surfaces. Elimination of this lubricant has been found to be desirable to overcome any possibility of its causing slippage of the braking and clutching elements and the present invention has as one of its objects the provision of a construction which eliminates any possibility of lubricant reaching either the brake or clutch elements of the braking system.

A further object of the invention is that of providing a construction having a bearing arrangement which will materially reduce the friction contacts between the operating parts of the wheel braking mechanism.

Another and further object of the invention is to provide a vehicle wheel braking mechanism which is sturdy, positive of operation and constructed to reduce servicing maintenance to a minimum.

Other objects, novel features of construction and improved results of the invention will appear from the following description when read in the light of the accompanying drawings and will be understood by those skilled in the art and can be ascertained by the practice and utilization of the invention.

One embodiment of the invention, which together with the description will serve to explain the principles of the invention form a part of the present application.

Figure 1:
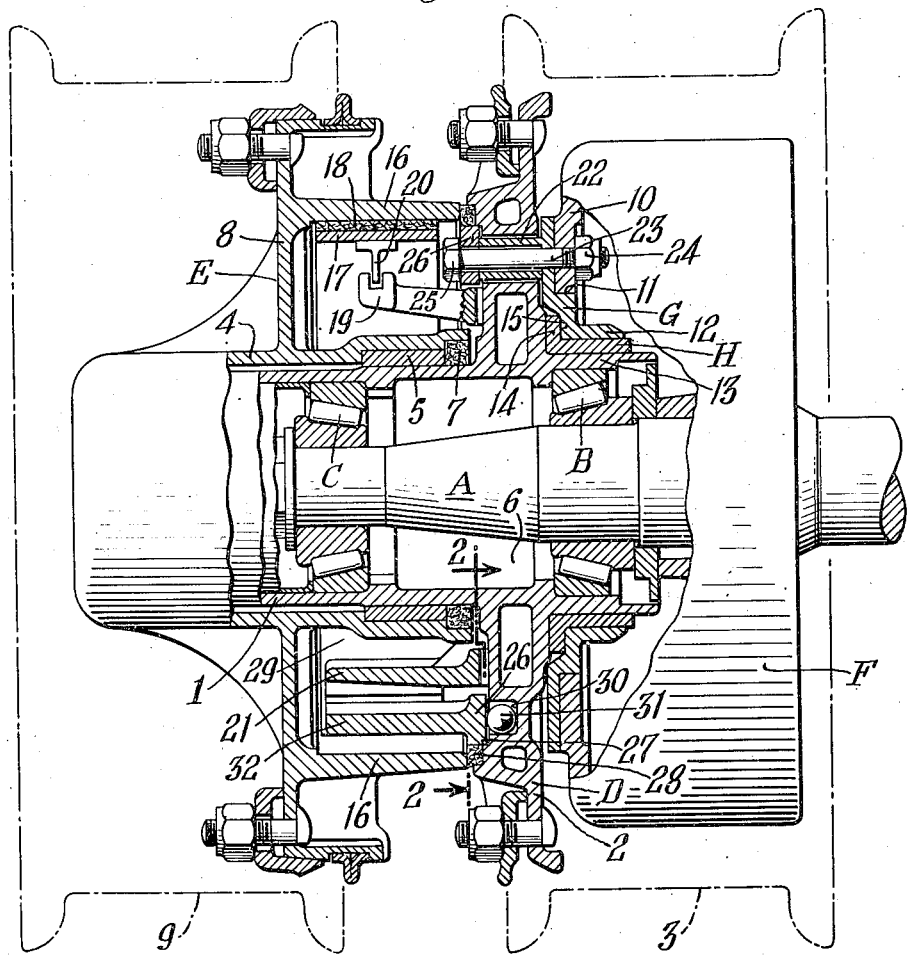
Fig. 1 is a side view of the dual wheel assembly, a portion of the view being broken away and shown in vertical section.

Describing the invention in detail, A is a vehicle shaft provided with a pair of spaced radial self-aligning bearings B and C upon which is rotatively supported the elongated hub 1 of an inner wheel D. The inner wheel has a web 2 which carries a rim 3, illustrated in dotted lines, for any usual or conventional tire.

An outer wheel E is arranged in side by side relationship to the inner wheel and its hub 4 telescopically receives the hub of the inner wheel and is rotatively supported thereon in part by a self-lubricating bearing 5 mounted exteriorly on the inner wheel hub. The outer end of the outer wheel hub is suitably rotatively supported in a manner, not shown, because it forms no specific part of the present invention. The outer end of the hub of the outer wheel is closed with the result that the hub of the inner wheel forms a chamber 6 surrounding the vehicle axle. This chamber serves as a receptacle for lubricant for the bearings supporting the inner wheel hub and the outer end of the outer wheel hub. Such lubricant as may reach and pass the bearing 5 is prevented from escape by a suitable oil seal 7. The outer wheel embodies a web 8 to which is attached a rim 9, illustrated in dotted lines, which is adapted to carry a suitable conventional tire.

The invention contemplates and embodies means whereby upon the application of braking pressure, through a single braking mechanism, to one of the independently rotating wheels the mechanism acts automatically to clutch the pair of wheels together so that braking action is applied uniformly to both wheels. In the present embodiment of the invention the braking action is applied to the inner wheel and the outer wheel is automatically clutched to the inner wheel.

Describing in detail the arrangement for accomplishing the foregoing, the inner wheel is provided with a brake drum F having an inner depending wall 10 which is in the form of an apertured ring. The peripheral edge of the brake wall aperture rests upon a circumferential shoulder 11 formed in a support G for the brake drum. This support G is of ring-like form and substantially L-shape in cross sectional configuration. A flat bottom or flange forms a hub 12 for the ring and this hub is rotatively supported upon a ring-like bearing H mounted exteriorly upon the inner end 13 of the inner wheel hub 1. This bearing is of the self-lubricating type and has a surrounding upstanding flange 14 which acts as a thrust bearing through engagement with the vertical wall 15 of the brake band support G and holds this wall of the support out of contacting engagement with the inner wheel web 2.

The outer wheel web 8 carries an inwardly extending open ended drum 16 within which is positioned a clutching element in the form of a split ring 17 the ends of which are in spaced relationship, for a reason hereinafter to be explained. This clutching element carries on its outer face a brake lining or similar material 18 adapted to be moved into clutching engagement with the inner face of the outer wheel drum 16. A forked end bracket 19 carried by the inner wheel web engages a lug 20 carried by the clutching element and its purpose is to properly position the clutching element longitudinally of the drum 16 and prevent any appreciable longitudinal movement of the clutching element. A stop lug 21 secured to the inner wheel web 2 projects in between the spaced ends of split ring 17 and engages said ends when said ring is in retracted or non-clutching position. The lug 21 serves as a stop for either end of the split ring 17 when the latter is expanded into clutching position by engagement of the finger 32 with the opposite end of the ring to displace said end and expand the ring, as hereinafter more fully described. The construction and operation is entirely similar to that shown in Patent No. 2,192,023.

Figure 2:
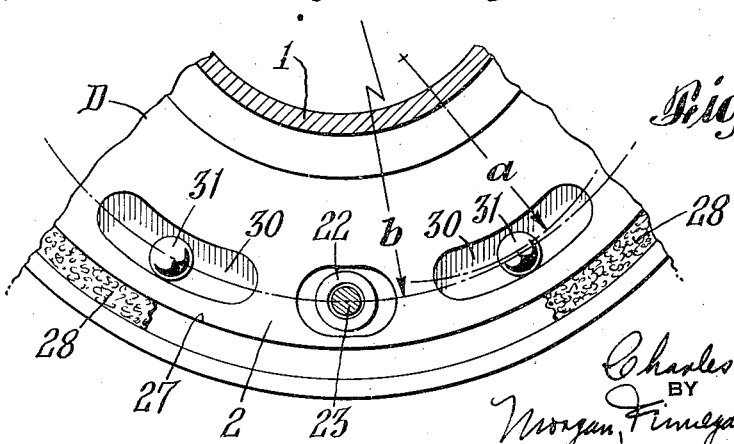
Fig. 2 is a fragmentary side view of the inner wheel web illustrating the roller bearings carried therein.

Describing further the mechanism which causes a clutching action upon the application of braking pressure, the inner wheel web 2 is provided with a plurality of spaced apart arcuate slots and the brake drum supporting ring G is formed with integral, spaced apart, outwardly extending spacing bosses 22 which are longitudinally apertured and carry bolts 23 which pass through suitable openings in the vertical wall 10 of the brake drum and carry on their inner ends nuts 24. The bosses and their bolts 23 extend through the arcuate slots of the inner wheel web and the headed ends 25 of the bolt clamp a clutch operating plate 26 against the outer face of the inner wheel web 2. To provide for taking up the thrust of the brake drum supporting ring G the outer face of the inner wheel web 2 is provided with spaced apart arcuate shaped pockets 30 each of which carries a ball-roller 31 which are in roller engagement with the bottoms of the pockets and the inner face of the clutch operating ring 26. The pockets 30, as illustrated by the arrows a and b in Figure 2, are curved on a shorter radius than the center axis of the wheel with the result that the balls are automatically centered in their pockets by centrifugal force between brake operations. These ball rollers operate without grease or other lubricant. This plate is nested within an annular shoulder 27 formed in the wheel web and is surrounded by an oil and dirt seal 28 which is abutted by the outer end of the outer wheel drum 16 with the result that the oil seal rings 7 and 27 seal the chamber 29 within the drum against the entry of oil or dirt thus protecting the clutch 17.

From the structure thus far described it will be seen that the brake drum F and its supporting ring G are secured together by the bolts 23 and by reason of the arcuate slots through which the bolts and their encircling spacing bosses pass the brake drum is mounted for limited arcuate movement upon its bearing H in respect to the inner wheel web 2. A finger 32, is carried by and extends outwardly from the outer face of the clutch operating plate 26 and reaches and occupies the gap between the ends of the clutch band 17.

Whenever the brake is applied to cause the brake shoes to engage the inner wheel brake drum F, the drum is retarded and relative rotary motion of the drum and clutch operating plate 26 carried thereby with respect to web D results, the finger 32 carried by plate 26 having the same relative rotary motion. As one end of the clutch band 17 is held against movement by stop lug 21 as hereinbefore set forth, this rotative movement of the finger 32 causes one end of the clutch band to be moved circumferentially which expands the band and causes it to engage the clutch drum 16 of the outer wheel with the result that braking pressure is thus applied concurrently to both wheels.

In the present construction the brake supporting ring G is held out of engagement with the wheel web and the self-lubricating bearing 12 rotatively supports the brake drum supporting ring and the thrust is taken up by the bearing collar 14. The engagement and resulting thrust between the inner wheel web and the clutch operating ring is through the ball rollers which reduce friction to the minimum and avoid the necessity of lubrication. In a construction wherein thrust on the brake band supporting ring and on the clutch operating ring is through actual contact with the inner wheel web, friction is exceedingly high and lubrication is provided with the consequent danger of the lubricant reaching the clutch band and thereby materially reducing its efficiency because of slippage.

The present inventive concept is not limited to the precise mechanisms illustrated and described as departures may be made therefrom within the scope of the accompanying claims without departing from the principles of the invention or sacrificing its advantages.

I claim:

1. In a dual web structure, an inner web and an outer web normally freely rotatable in respect to one another, a brake drum at the inner side of the inner web and a clutch drum carried by the inner side of the outer web and having therein a drum clutching element, said brake drum being mounted for limited rotative movement in respect to the inner web, a clutch operating plate carried by the brake drum and disposed beyond and adjacent the outer side of the inner web and having operative connection with the clutching element, a cylindrical ring bearing supporting the brake drum for said limited rotative movement, said bearing having a relatively short, outwardly radially extending flange engaging a radially inner portion of said inner web for absorbing longitudinal axial thrust upon the drum and holding the drum out of contact with the inner web side wall, the outer face of the inner web side wall being provided circumferentially with a plurality of spaced apart elongated arcuate pockets, each of said pockets being provided with a ball roller engaging and holding the clutch actuating plate out of engagement with the side wall of the inner wheel.

2. A construction as defined in claim 1 wherein, each of said pockets is curved at a radius shorter than that from the center of the pockets to the axial center of the inner wheel.

CHARLES P. TOLMAN.

REFERENCES CITED

The following references are of record in the file of this patent:

UNITED STATES PATENTS

| Number | Name | Date |
|---|---|---|
| 2,192,023 | Ash | Mar. 3, 1942 |